United States Patent [19]

Spoor et al.

[11] 3,871,908

[45] Mar. 18, 1975

[54] PRODUCTION OF URETHANE GROUP CONTAINING COATINGS BY CURING WITH IONIZING RADIATION

[75] Inventors: Herbert Spoor, Limburgerhof; Kurt Demmler, Ludwigshafen, both of Germany

[73] Assignee: Badische Anilin-& Soda-Fabrik Aktiengesellschaft, Ludwigshafen/Rhein, Germany

[22] Filed: Dec. 28, 1971

[21] Appl. No.: 213,153

[30] Foreign Application Priority Data
Dec. 31, 1970 Germany.................... 2064 701

[52] U.S. Cl. 117/93.31, 117/161 KP, 117/161 UN, 117/DIG. 7, 204/159.19, 260/859 R
[51] Int. Cl. ........................... B44d 1/50, C08f 3/38
[58] Field of Search...... 117/93.31, 161 KP, DIG. 7, 117/161 UN; 204/159.19; 260/859 R, 77.5 CR

[56] References Cited
UNITED STATES PATENTS

| | | | |
|---|---|---|---|
| 2,326,287 | 8/1943 | Coffman | 260/77.5 CR |
| 2,334,476 | 11/1943 | Coffman | 260/77.5 CR |
| 2,468,713 | 4/1949 | Kropa et al. | 260/859 |
| 3,531,547 | 9/1970 | Hazen et al. | 117/93.31 |
| 3,607,973 | 9/1971 | Holicky et al. | 260/859 R |
| 3,616,364 | 10/1971 | D'Alelio | 117/161 KP |
| 3,632,796 | 1/1972 | Holicky et al. | 260/859 R |

Primary Examiner—William D. Martin
Assistant Examiner—John H. Newsome
Attorney, Agent, or Firm—Johnston, Keil, Thompson & Shurtleff

[57] ABSTRACT

The present invention relates to a process for the manufacture of coatings by applying ionizing radiation to a composition which contains olefinically unsaturated polymeric materials having urethane groups and has been applied to a substrate. The polymeric materials, which may be used in combination with olefinically unsaturated monomeric compounds and conventional additives, contain, in the same molecule, at least two units of the general formula

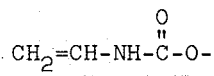

and/or

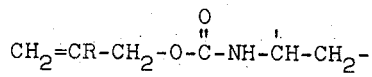

where R is hydrogen or methyl.

10 Claims, No Drawings

PRODUCTION OF URETHANE GROUP CONTAINING COATINGS BY CURING WITH IONIZING RADIATION

This invention relates to a process for the manufacture of coatings by applying ionizing radiation to a composition which contains olefinically unsaturated polymeric materials having urethane groups and has been applied to a substrate.

It is known to cure high molecular weight olefinically unsaturated materials in admixture with olefinically unsaturated monomeric compounds by the action of ionizing radiation.

U.K. Pat. No. 1,159,552 describes binding agents capable of being polymerized by ionizing radiation and consisting of an adduct of a diisocyanate and $C_{5-12}$ monohydroxyacrylic compounds having a molecular weight of less than 900 and an olefinically unsaturated organic resin having a molecular weight of more than 1,000.

Dutch Patent Application 67/01830 published on Aug. 8, 1968 further discloses the use of certain urethanes, such as reaction products of castor oil, toluene diisocyanate and 2-hydroxyethyl methacrylate, containing two urethane groups per double bond, in combination with styrene or other vinyl monomeric compounds, as binding agents which can be cured by the action of electron beams.

Similarly, French Pat. No. 1,513,285 discloses olefinically unsaturated resins having molecular weights of more than 1,000 and containing at least two urethane groups per olefinic double bond, which resins are obtained by reacting diisocyanates with hydroxyl group-containing organic polymers followed by the addition of a hydroxyl group-containing vinyl monomer and can be cured by ionizing radiation.

It is an object of the present invention to provide a process for the manufacture of coatings by curing urethane group-containing olefinically unsaturated compounds by means of ionizing radiation, which is easier to carry out than the prior art methods and results in superior properties of the coatings.

This and other objects and advantages of the invention are achieved in a process for the manufacture of coatings by curing olefinically unsaturated, urethane group-containing polymeric materials which have been applied to a substrate optionally in admixture with olefinically unsaturated monomeric compounds and conventional additives, by means of ionizing radiation, wherein the olefinically unsaturated, urethane group-containing polymeric materials contain at least two units of the general formula

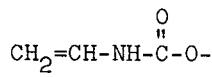

and/or

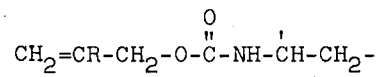

where R is hydrogen or methyl.

With reference to the structure of the urethane group-containing, olefinically unsaturated polymeric materials suitable for the process of the invention it may be stated for the process of the invention it may be stated that these materials are connveniently prepared by reacting hydroxyl group-containing oligomeric or polymeric organic materials with vinyl isocyanate and/or reacting vinyl isocyanate homopolymers or copolymers with olefinically unsaturated alcohols such as allyl alcohol or methallyl alcohol.

Suitable hydroxyl group-containing oligomeric or polymeric organic materials for use as starting products in the preparation of the urethane group-containing polymeric materials used in the present invention include hydroxyl group-containing oligomeric or polymeric materials obtained by the addition, condensation or polymerization of suitable monomers, for example polyethers containing terminal hydroxyl groups such as the polymerization products of monoepoxides, for example the oligomers and polymers of ethylene oxide, propylene oxide, polymers of tetrahydrofuran, and their copolymers and graft copolymers such as are obtained by graft polymerization of ethylene oxide onto polypropylene oxide by conventional methods. Also suitable are saturated and unsaturated polyesters obtained by the polyaddition of monoepoxides such as ethylene oxide or propylene oxide to saturated and/or unsaturated polycarboxylic acids or polycarboxylic acid anhydrides, in particular dicarboxylic acids or dicarboxylic acid anhydrides, such as maleic, fumaric or itaconic acid or the anhydrides thereof, or saturated aliphatic or aromatic dicarboxylic acids such as succinic, glutaric, α-methylglutaric, adipic, sebacic, o-phthalic, isophthalic, terephthalic, 1,2,3,6-tetrahydrophthalic and 3,6-endomethylene-1,2,3,6-tetrahydrophthalic acids, dimerized oleic acid or polyfunctional carboxylic acids such as 1,2,4-benzenetricarboxylic acid, 1,2,4,5-benzenetetracarboxylic acid or polymethacrylic acid and mixtures thereof, optionally in combination with monocarboxylic acids such as oleic acid, other fatty acids or, say, ethylhexanoic acid. These polyesters carry free terminal hydroxyl groups and are described, for example, in Houben-Weyl, Methoden der organischen Chemie, Vol. 14/2 (1963).

Suitable saturated and/or unsaturated polyesters containing free terminal hydroxyl groups may be alternatively prepared by melt condensation or condensation under azeotropic conditions of the above saturated and/or unsaturated and/or aromatic polycarboxylic, preferably dicarboxylic, acids, or anhydrides thereof, with polyhydric and in particular dihydric alcohols such as alkanediols, for example ethylene glycol, propylene glycol-1,2, butanediol-1,3, butanediol-1,4, hexanediol-1,6, 2,2-dimethylpropanediol-1,2, diethylene glycol, triethylene glycol, dipropylene glycol, cyclohexanediol-1,2, cyclohexanedimethanol, 2,2-bis(p-hydroxycyclohexyl)propane, hydrogenated bis-phenol A, neopentyl glycol and 1,4-bis-methylolcyclohexane. Trihydric and higher polyhydric alcohols, optionally in combination with monohydric alcohols, for example furfuryl alcohol, fatty alcohols and ethylhexanol, may be included in minor quantities, examples being glycerol, pentaerythritol and trimethylolpropane.

By using unsaturated polyesters the degree of crosslinking of the cured coating is enhanced, so that the elasticity, hardness, dimensional stability, swellability, etc., may be varied as desired.

To obtain polyesters containing free terminal hydroxyl groups, they are prepared using the alcoholic component in a slight to moderate excess over the acid component.

Apart from polyethers and polyesters, copolymers containing at least two free hydroxyl groups per molecular are also suitable for use as starting materials in the preparation of the olefinically unsaturated urethanes used in the process of the invention, examples being copolymers of allyl alcohol, methallyl alcohol, S-vinylthioethanol, acrylic or methacrylic acid monoesters of alkanediols with other usual copolymerizable olefinically unsaturated compounds such as vinylaromatic compounds, for example styrene or vinyltoluene, acrylates or methacrylates with $C_{1-8}$ alkanols, vinyl esters of carboxylic acids of from two to 11 carbon atoms and other usual copolymerizable monomers. Also suitable are partially saponified vinyl ester polymers.

The hydroxyl group-containing oligomers or polymers used in the reaction with vinyl isocyanate generally have a molecular weight of from 500 to 10,000 and preferably from 1,000 to 4,000.

The reaction of the hydroxyl group-containing oligomers or polymers with vinyl isocyanate to form the olefinically unsaturated compounds containing at least two groups of the formula

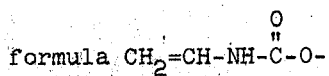

is conveniently carried out at temperatures of from 20° to 150°C and preferably at about 100°C. In the reaction with the hydroxyl group-containing oligomers or polymers, vinyl isocyanate is used in amounts such that substantially all of the free hydroxyl groups and at least two hydroxyl groups per molecule of the hydroxyl group-containing products are reacted with vinyl isocyanate to form the corresponding urethane groupings having terminal vinyl groups. These products, which may be used, if desired, in admixture with other olefinically unsaturated copolymerizable compounds, particularly olefinically unsaturated copolymerizable monomeric compounds, for example styrene, vinyltoluene, esters of acrylic or methacrylic acid with $C_{1-12}$ alkanols or $C_{1-12}$ cycloalkanols or vinyl esters of carboxylic acids having from 2 to 11 carbon atoms and, in particular, esters of acrylic and/or methacrylic acid with $C_{2-6}$ alkanediols or oxa-alkanediols, in the process of the invention, represent the preferred products for use in our process.

Alternatively, vinyl isocyanate homopolymers or copolymers containing free isocyanate groups may be reacted with olefinically unsaturated hydroxyl-containing substances such as allyl alcohol or methallyl alcohol and the resulting urethane-containing olefinically unsaturated polymers may be used in the process of the invention, optionally in admixture with copolymerizable olefinically unsaturated compounds such as the vinylaromatic compounds and acrylic, methacrylic and/or vinyl esters mentioned above.

The urethane group-containing olefinically unsaturated polymeric materials suitable for use in the process of the invention generally have a molecular weight of from 1,000 to 20,000 and preferably from 1,000 to 5,000.

Other suitable olefinically unsaturated ingredients for optional admixture with the olefinically unsaturated, urethane group-containing polymers are, in addition to the said copolymerizable monomers (vinylaromatic compounds and/or olefinically unsaturated esters), any of the usual unsaturated polyesters, olefinically unsaturated oils such as polybutadiene oils, and other usual polycondensates or polyadducts such as alkyd resins and maleate oils.

The urethane group-containing products of the invention may be advantageously used in combination with copolymerizable olefinically unsaturated monomeric compounds, the proportion of monomer being from 10 to 200 percent by weight of the urethane group-containing polymer. They may also be used in combination with olefinically polyunsaturated compounds such as diallyl phthalate or triallyl cyanurate.

Homogeneous mixtures may be prepared by mixing the ingredients in conventional equipment.

The compositions forming the binding agent used in the process of the invention may also contain conventional additives such as fillers, e.g., chalk, dolomite, titanium dioxide, barite, barium sulfate and kaolin, pigments and/or inorganic or organic dyes in quantities of up to 70 percent by weight of the weight of the binding agent composition, and other conventional auxiliaries in minor quantities of up to 10 percent by weight, such as stability-improving inhibitors, e.g., hydroquinone, t-butyl pyrocatechol, p-benzoquinone and copper salts in quantities ranging from 0.001 to 0.1 percent, and accelerators, e.g., 1,3-diketo compounds or phosphines, plasticizers, flow improves and natural or synthetic resins based on polymers or polycondensates.

Suitable additives are also described in the cited U.K. Patent Specification.

The process of the invention is suitable for the manufacture of coatings on metal surfaces, for example iron, steel and aluminum surface, and on glass, ceramics, porcelain, wood, paper and plastics materials having either porous or smooth surfaces.

Methods of applying the binding agent composition, conveniently used in a fluid state, are the conventional methods of application such as spraying, dipping, flooding, knife-coating or pouring.

We have found it advantageous to apply the coating composition in a layer having a thickness of up to 500 $\mu$m, particularly from 20 to 200 $\mu$m.

Suitable ionizing radiation for curing the coatings includes $\alpha$-rays, X-rays, $\gamma$-rays, the mixed radiation produced in nuclear reactors and, preferably, electron beams.

Suitable sources of radiation are, for example, cobalt 60, nuclear reactors and, for electron beams, Van der Graaf generators and other commercial electron beam generators. Units conventionally used for the production of ionizing radiation and electron beams are described, for example, in A. Charlesby, Atomic Radiation and Polymers, 1960, Pergamon Press, Oxford. The amount of radiation energy used depends on the thickness of the coatings to be cured. We have found that electron radiation produced with an accelerating potential of from 100 to 500 kv and particularly from 100 to 300 kv is particularly advantageous in our process.

The radiation dose required for curing is governed by the composition of the mixture of olefinically unsaturated organic compounds to be cured but is generally in the range 1 to 50 megarads and preferably less than 20 megarads. Particularly when aromatic structures are not present, relatively low doses are sufficient for curing. Irradiation is conveniently carried out in the absence of air (e.g., by effecting irradiation in an inert gas or by covering the coating with a film).

The duration of irradiation depends on the intensity of radiation used, the distance between the source of radiation and the coating to be cured and the thickness of the latter.

Conveniently, the process of the invention is carried out using an apparatus in which the substrate coated with the material to be cured is passed beneath the source of radiation on a conveyer belt.

The process of the invention is simple and safe, has very low curing doses and results in highly advantageous properties of the resulting coatings. The coatings produced in our process show good adhesion to the substrate, low tendency to discoloration and good mechanical properties. Our process also makes it possible to vary the elasticity and degree of cross-linking as desired. The resulting coatings also show good surface hardness.

In the following Examples the parts are by weight.

EXAMPLE 1

50 parts of the reaction product of 1,000 parts of a polyester of adipic acid neopentyl glycol (acid value less than 5, hydroxyl value 59) and 75 parts of vinyl isocyanate are mixed with 50 parts of triethylene glycol diacrylate and applied to metal sheeting to form a coating 100 μm thick thereon, which is then irradiated under a blanket of nitrogen with 2 megarads of electrons accelerated at 300 kv. There is produced a nail-hard, elastic film showing good adhesion to the substrate and only slight discoloration.

EXAMPLE 2

A mixture of 100 parts of methyl methacrylate, 100 parts of ethyl acrylate and 34.5 parts of vinyl isocyanate is added, at 120°C with stirring, to a solution of 3.5 parts of benzoyl peroxide and 500 parts of xylene, the resulting mixture being maintained at 120°C for a further 3 hours. After cooling to room temperature and adding 0.1 part of hydroquinone, there are added, dropwise, 72 parts of 1,4-butanediol monoacrylate and the mixture is held at room temperature for 1 hour and then at 50°C for 1 hour. The mixture is filtered and the xylene is distilled off in vacuo. To the residue there is added 0.1 part of hydroquinone and 0.05 part of p-benzoquinone, and the whole is then dissolved in 195 parts of triethylene glycol diacrylate.

Films of this composition applied wet in a thickness of 200 μm are cured when irradiated, under a blanket of inert gas, with electrons which have been accelerated by a potential of 320 kv, the radiating current being 50 milliamps, the distance from the scanner window to the surface of the film approximately 6 cm and the speed of transport of the conveyor belt 28 m/min.

There are thus produced nail-hard coatings of good elasticity.

We claim:

1. A process for the manufacture of coatings which comprises: applying a coating composition containing an olefinically unsaturated, urethane group-containing polymeric material prepared by reacting oligomers or polymeric organic materials, which contain at least two free hydroxyl groups per molecule, with vinyl isocyanate to a substrate in admixture with olefinically unsaturated monomeric compounds, said olefinically unsaturated, urethane group-containing polymeric materials containing at least two units of the formula

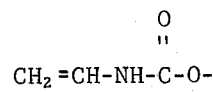

and thereafter curing said material by means of ionizing radiation to form a coating on said substrate.

2. A process as set forth in claim 1, wherein the composition used in the preparation of the coatings contains at least one additive of fillers, pigments, inorganic and organic dyes, polymerization inhibitors, polymerization accelerators, plasticizers, flow improvers or natural and synthetic resins.

3. A process as set forth in claim 1 wherein the substrate to be coated is an article having a metal surface.

4. A process as set forth in claim 1 wherein the olefinically unsaturated, urethane group-containing polymeric materials have been prepared by reacting vinyl isocyanate with at least one oligomer or polymer containing two free hydroxyl groups per molecule and selected from the group consisting of polyethers, saturated polyesters, unsaturated polyesters and copolymers of allyl alcohol, methallyl alcohol, S-vinylthioethanol, acrylic or methacrylic monoesters of alkanediols, which hydroxyl group-containing oligomers or polymers have a molecular weight of from 500 to 10,000.

5. A process as set forth in claim 1 wherein the olefinically unsaturated monomeric compounds are vinylaromatic compounds or olefinically unsaturated esters.

6. A process as set forth in claim 1 wherein the olefinically unsaturated monomeric compounds are esters of acrylic or methacrylic acid with alkanediols or oxyalkane diols of from two to six carbon atoms.

7. A process as set forth in claim 1 wherein the ionizing radiation used consists of electron beams which have been produced using an accelerating potential of from 100 to 500 kv.

8. A process as set forth in claim 1 wherein curing is effected with a radiation dose of from 1 to 50 megarads.

9. A process as set forth in claim 1 wherein said coating composition has a thickness of from 20 to 500 microns.

10. An article coated with a composition comprising an olefinically unsaturated, urethane group-containing polymeric material prepared by reacting oligomers or polymeric organic materials, which contain at least two free hydroxyl groups per molecule, with vinyl isocyanate in admixture with olefinically unsaturated monomeric compounds, said olefinically unsaturated, urethane group-containing polymeric materials containing at least two units of the formula,

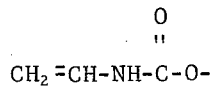

and thereafter curing said material by means of ionizing radiation to form a coating on said substrate, said composition being cured by means of ionizing radiation.

* * * * *